United States Patent
Schnell et al.

(10) Patent No.: US 7,864,873 B2
(45) Date of Patent: Jan. 4, 2011

(54) METHOD FOR SPECTRAL SIDE LOBE SUPPRESSION IN OFDM-BASED COMMUNICATION SYSTEM

(75) Inventors: Michael Schnell, Gilching (DE); Sinja Brandes, Neufahrn (DE)

(73) Assignee: Deutsches Zentrum für Luft- und Raumfahrt e. V., Bonn (DE)

( * ) Notice: Subject to any disclaimer, the term of this patent is extended or adjusted under 35 U.S.C. 154(b) by 902 days.

(21) Appl. No.: 11/248,477

(22) Filed: Oct. 12, 2005

(65) Prior Publication Data

US 2006/0077885 A1 Apr. 13, 2006

(30) Foreign Application Priority Data

Oct. 12, 2004 (DE) ................... 10 2004 049 802

(51) Int. Cl.
*H04K 1/10* (2006.01)
(52) U.S. Cl. .................... 375/260; 375/259; 375/262; 375/267; 375/295; 375/342; 370/208; 370/203; 370/206; 370/330
(58) Field of Classification Search ................ 375/219, 375/220, 242, 254, 259, 260, 267, 286, 316, 375/322, 342, 343, 346, 347, 354, 299, 306, 375/262; 370/203, 208, 210
See application file for complete search history.

(56) References Cited

U.S. PATENT DOCUMENTS

| 6,035,000 | A | 3/2000 | Bingham | |
|---|---|---|---|---|
| 6,424,681 | B1 | 7/2002 | Tellado et al. | |
| 6,512,797 | B1 | 1/2003 | Tellado et al. | |
| 7,342,974 | B2 * | 3/2008 | Chiou | 375/260 |
| 7,450,542 | B2 * | 11/2008 | Alamouti et al. | 370/330 |
| 2002/0105901 | A1 | 8/2002 | Chini et al. | |
| 2002/0196734 | A1 * | 12/2002 | Tanaka et al. | 370/210 |
| 2003/0203717 | A1 * | 10/2003 | Chuprun et al. | 455/12.1 |
| 2004/0066283 | A1 * | 4/2004 | Manis et al. | 340/310.01 |
| 2004/0114507 | A1 * | 6/2004 | Yoo et al. | 370/208 |
| 2004/0141548 | A1 * | 7/2004 | Shattil | 375/146 |
| 2004/0162097 | A1 | 8/2004 | Vijayan et al. | |
| 2004/0264508 | A1 | 12/2004 | Henkel et al. | |

(Continued)

FOREIGN PATENT DOCUMENTS

CA 2 356 183 A1 6/2000

(Continued)

OTHER PUBLICATIONS

Proakis, J.G.: "Digital Communications," New York:McGraw-Hill Inc., 1995, pp. 556-561.

(Continued)

*Primary Examiner*—Shuwang Liu
*Assistant Examiner*—Hirdepal Singh
(74) *Attorney, Agent, or Firm*—Collard & Roe, P.C.

(57) ABSTRACT

The invention relates to N subcarriers of an OFDM communication system or OFDM based multi-carrier communication system M subcarriers used as cancellation subcarriers to achieve side lobe suppression of the OFDM transmission signal, where M<N. The M cancellation subcarriers are scaled with a generally complex weighting factor. Determining the weighting factor is performed in accordance with a suitable optimization criterion. Application in OFDM-based wireless and wired communication systems.

23 Claims, 3 Drawing Sheets

U.S. PATENT DOCUMENTS

| | | | |
|---|---|---|---|
| 2005/0047535 A1 | 3/2005 | Ahmed et al. | |
| 2006/0093053 A1* | 5/2006 | Jones et al. | 375/260 |
| 2007/0060058 A1* | 3/2007 | Shattil | 455/63.1 |

FOREIGN PATENT DOCUMENTS

| | | |
|---|---|---|
| EP | 0 725 510 A1 | 8/1996 |
| EP | 1 161 025 A2 | 12/2001 |
| EP | 1 422 897 A2 | 5/2004 |
| EP | 1 450 506 A1 | 8/2004 |
| WO | WO 97/40609 A1 | 10/1997 |
| WO | WO 00/38386 | 6/2000 |
| WO | WO 03/026240 A2 | 3/2003 |
| WO | WO 03/063459 A2 | 7/2003 |
| WO | WO 2004/105336 | 12/2004 |

OTHER PUBLICATIONS van Nee, R.; Prasad, R: "OFDM for Wireless Multimedia Communications," Boston: Artech House, 2000, pp. 42-45.

Baldemair, R., "Suppression of narrow frequency bands in multicarrier transmission systems," Eusipco—Proceedings of the X European Signal Processing Conference, Finland, Sep. 4, 2000, pp. 553-556, XP 002372892. (EP app).

Yoo, H. et al., "Edge Sidelobe Suppressor Scheme for OFDMA Uplink Systems," IEEE Communications Letters, IEEE Service Center, Piscataway, NJ, Bd. 7, No. 11, Nov. 2003, pp. 534-536. XP-001185628 (EP app).

Brandes, S. et al., "Reduction of out-of-band radiation in OFDM based overlay systems," New Frontiers in Dynamic Spectrum Access Networks, 2005, Dyspan 2005, First IEEE International Symposium on Baltimore, MD, Nov. 2005, Piscataway, NJ, pp. 662-665. XP-010855171 (EP app).

Brandes, S. et al., "Sidelobe supression in OFDM systems by insertion of cancellation carriers," Vehicular Technology Conference 2005, VTC-2005-FALL-2005 IEEE $62^{nd}$ Dallas, TX, Sep. 2005, Piscataway, NJ, pp. 152-156. XP-010878440 (EP app).

* cited by examiner

METHOD FOR SPECTRAL SIDE LOBE SUPPRESSION IN OFDM-BASED COMMUNICATION SYSTEM

CROSS REFERENCE TO RELATED APPLICATIONS

Applicants claim priority under 35 U.S.C. §119 of German Application No. 10 2004 049 802.4 filed Oct. 12, 2004.

FIELD OF THE INVENTION

The invention relates to a method for spectral side lobe suppression of the transmitter signal in wireless or wired orthogonal frequency-division multiplexing (OFDM) communication systems and in OFDM or OFDM-based multicarrier communication systems.

PRIOR ART

The spectrum of an OFDM transmission signal is known to comprise strong side lobes. This means that in OFDM communication considerable spurious transmission is radiated outside of the communication bandwidth.

Various possibilities exist in prior art for spectral side lobe suppression in OFDM.

Spectral side lobes can be particularly suppressed by filtering. This, however, means, for one thing, additional design complications and thus added costs. For another, the transmission signal is influenced by the filtering and interference can occur. More particularly, due to filtering the OFDM symbol is elongated in the time domain, as a result of which the nuisance of symbol interference may materialize between OFDM symbols in sequence.

Spectral side lobe suppression can also be achieved in OFDM communication systems by providing large guard bands to neighboring systems in the frequency domain or subcarriers left free at the edge of the frequency domain of the OFDM communication system. The method of leaving subcarriers free at the edge of the frequency domain, i.e. with no assignment of data symbols, is used, for example, in digital audio broadcasting (DAB) and digital video broadcasting—terrestial (DVB-T) standards. These known measures are, however, inefficient and waste the valuable spectrum resource. When only a small frequency domain is available for communication there is no sense in placing an OFDM communication system in this frequency domain when large guard bands are to be provided or sub-bands need to be left free.

Spectral side lobe suppression can also be achieved in OFDM communication systems by pulse shaping. Instead, of the square pulse for the OFDM symbol in the time domain other pulse shapes can be selected which have a more favorable spectrum, i.e. a spectrum whose side lobes fade out faster. Examples of such pulses are Nyquist pulses such as, for example, the raised cosine pulse. But other pulse shapes other than the square pulse are also hampered by drawbacks, namely by the spread of the OFDM symbol with time which may result in symbol interference. Apart from this, this no longer permits use for OFDM modulation and demodulation by means of discrete Fourier transformation (DFT)/inverse discrete Fourier transformation (IDFT) or fast Fourier transformation (FFT)/inverse fast Fourier transformation (IFFT).

Prior art spectral side lobe suppression in OFDM communication systems as described above is based on textbook knowledge for reference, for example, from the book by Proakis, J. G: "Digital Communications", New York: McGraw-Hill Inc., 1995 or the book by van Nee, R.; Prasad, R.: "OFDM for Wireless Multimedia Communications", Boston: Artech House, 2000.

In some OFDM communication systems there is a need to make use of small frequency domains, as is the case, for example, in the concept of OFDM-based overlay communication systems. An overlay communication system is one which works in the spectrum of another communication system where it is permitted to use the idle frequency domains therein for communication.

SUMMARY OF THE INVENTION

The present invention is based on the object of suppressing or at least substantially reducing spectral side lobes in OFDM communication systems and in OFDM or OFDM-based multicarrier communication systems without requiring any additional complicated filtering and without the OFDM transmission signal being influenced by filtering causing interference, particularly symbol interference. In addition, it is also the intention in spectral side lobe suppression in accordance with the present invention to fully exploit the valuable spectrum resource without waste which is particularly of major importance when only a small frequency domain is available for communication.

In accordance with the present invention relating to a method for spectral side lobe suppression in OFDM communication systems and in OFDM communication systems or OFDM-based multicarrier communication systems of the aforementioned kind this object is achieved to advantage by inserting determined subcarriers as cancellation subcarriers in the frequency domain of the communication system which carry no data information and contain instead of complex data symbols, special generally complex weighting factors and by the weighting factors being determined so that in accordance with an optimization criterion the spectral side lobes of the OFDM transmission signal are minimized.

Side lobe suppression in OFDM systems and OFDM-based multi-carrier communication systems is thus achieved in accordance with the present invention by inserting cancellation subcarriers. These cancellation subcarriers carry no information. Instead of a complex data symbol the cancellation subcarriers contain special complex weighting factors. These are determined so that in accordance with an optimization criterion the side lobes of the OFDM transmission signal are minimized. In other words, the cancellation subcarriers serve to cancel out or reduce the side lobes generated by other subcarriers of the OFDM communication system.

As compared to prior art the method in accordance with the present invention excels by a number of advantages. Neither symbol interference nor any other interference is generated. Only very small guard bands are now needed. DFT/IDFT or FFT/IFFT can continue to be used for OFDM modulation and demodulation.

The sole drawback of the method in accordance with the present invention is that the cancellation subcarriers are not avilable for data communication, resulting in a slight reduction in the communication capacity.

Advantageous aspects, further embodiments and uses of the method in accordance with the present invention for spectral side lobe suppression of the transmitter signal in wireless or wired OFDM communication systems and in OFDM or OFDM-based multicarrier communication systems read from the sub-claims relating back to claim 1 directly or indirectly.

DESCRIPTION OF THE DRAWINGS

For a better understanding the present invention will now be explained by way of a relatively simple example embodiment with reference to the attached drawings in which.

Considered is an OFDM communication system having N=8 subcarriers and binary phase shift keying (BPSK) modulation. BPSK means that binary communication symbols $d_n$, n=1, ..., N, are transmitted, interference i.e. $d_n \in \{+1,-1\}$. The duration of a BPSK symbol is termed $T_s$. Since an OFDM symbol simultaneously communicates N BPSK symbols, the duration of an OFDM symbol is $T=N \cdot T_s$. The subcarriers in the OFDM communication system are numbered in sequence from left to right, in other words with increasing center frequency, the subcarrier at left-hand edge being denoted with 1 and its center frequency with $f_1$ and the subcarrier at the right-hand edge with N and its center frequency with $f_N$. The subcarriers in the following are termed $s_n(x)$, n=1, ..., N, and can be represented in accordance with $$s_n(x) = d_n \cdot \frac{\sin(x - x_n)}{x - x_n}, n = 1, \ldots, N \quad (1)$$

where $x=fT/\pi$ signifies the scaled frequency and $x_n=f_n T/\pi$ the scaled center frequency of the subcarrier n. For further simplification the number of cancellation subcarriers in the example under consideration is defined M=2, and the subcarriers 1 and N are selected as cancellation subcarriers. Furthermore, as an example, the symbol sequence $\{d_2, \ldots, d_{N-1}\}=\{+1, \ldots, +1\}$ is selected for the BPSK communication under consideration.

Figure 1:
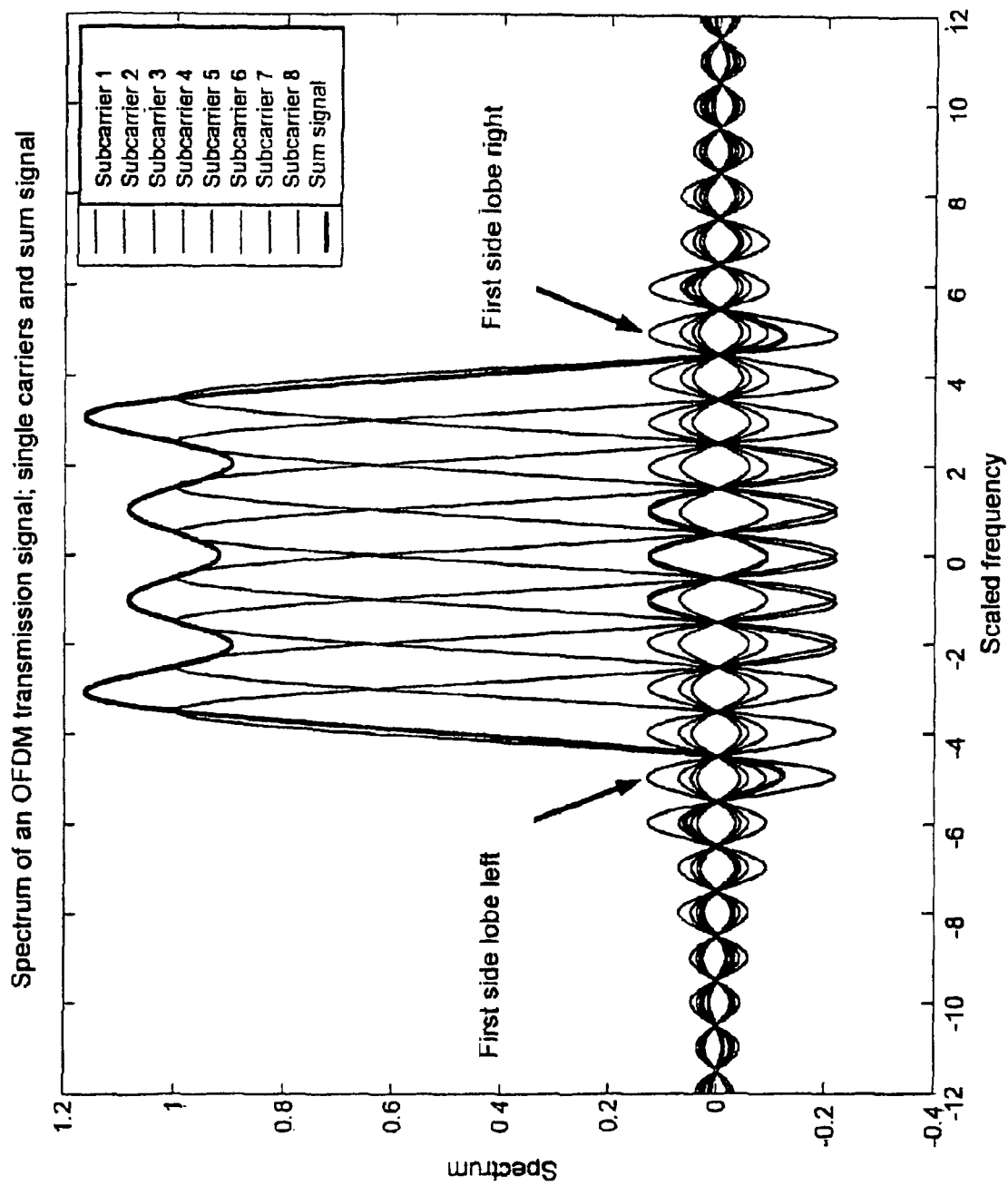
FIG. 1 is a graph plotting the spectrum of a usual OFDM transmission signal with subcarrier spectra as well as the spectrum of the summation signal for an OFDM communication system with eight subcarriers.

Referring now to FIG. 1 there is illustrated the spectrum of the single carriers (thin line) and the spectrum of the summation signal (bold line) for an OFDM communication with N=8 subcarriers without use of cancellation subcarriers. In this example the first side lobe is in the positive range of the scaled frequency $x=fT/\pi$ between x=4.5 and x=5.5. Correspondingly, the first side lobe in the negative range of the scaled frequency $x=fT/\pi$ is between x=−5.5 and x=−4.5. All side lobes have the same scaled width $\Delta x=1$ in the frequency domain. The amplitude of the side lobes decreases with increasing |x|.

Figure 2:
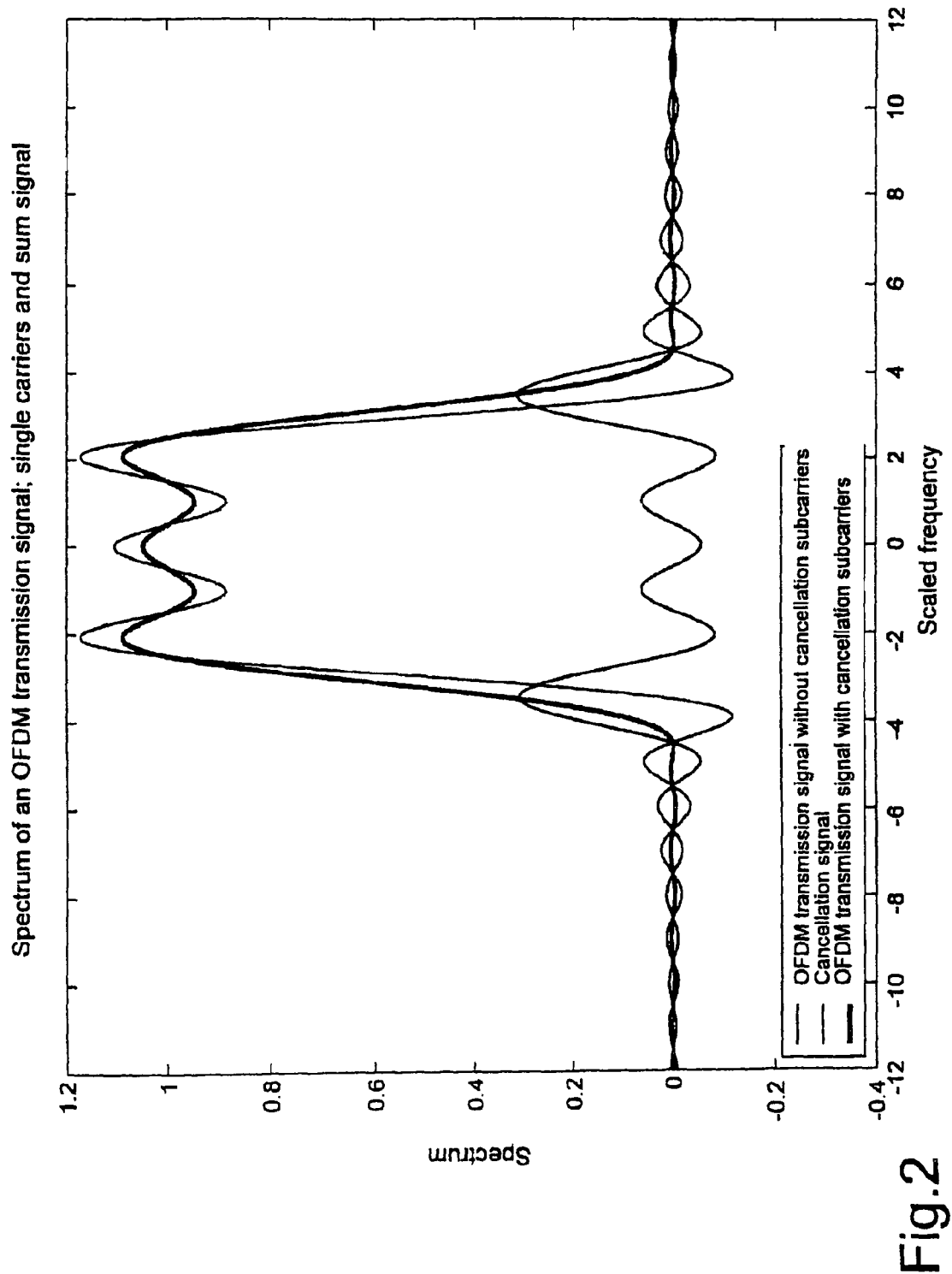
FIG. 2 is a graph plotting the spectrum of an OFDM transmission signal working in accordance with the present invention in making use of cancellation subcarriers showing the spectra of the summation signal for OFDM communication, the summation signal of the two cancellation subbarriers and of the final OFDM transmission signal resulting from the summation signal for OFDM communication and the two cancellation subcarriers.

It will now be shown in the following how in accordance with the present invention the side lobes can be reduced by the insertion of cancellation subcarriers. In the present example M=2 cancellation subcarriers are used, i.e. the subcarriers 1 and 8 at each edge of the OFDM spectrum. Referring now to FIG. 2 there is illustrated the spectrum of the summation signal for OFDM communication (thin grey line) which results when the two subcarriers 1 and 8 are omitted. Furthermore, the two cancellation subcarriers (thin line) as well as the spectrum of the final OFDM transmission signal (bold line) are plotted, resulting from the subcarriers 2 to 7 and the two cancellation subcarriers. Clearly evident is the reduction of the side lobes in the spectrum of the final OFDM transmission signal. It is to be noted that the cancellation subcarriers produce no interference in data communication on the other subcarriers. The cancellation subcarriers are normal OFDM subcarriers and thus orthogonal to all other subcarriers. The cancellation subcarriers merely comprise special weighting factors which as a rule are unequal to the BPSK symbol values $\{+1,-1\}$.

Figure 3:
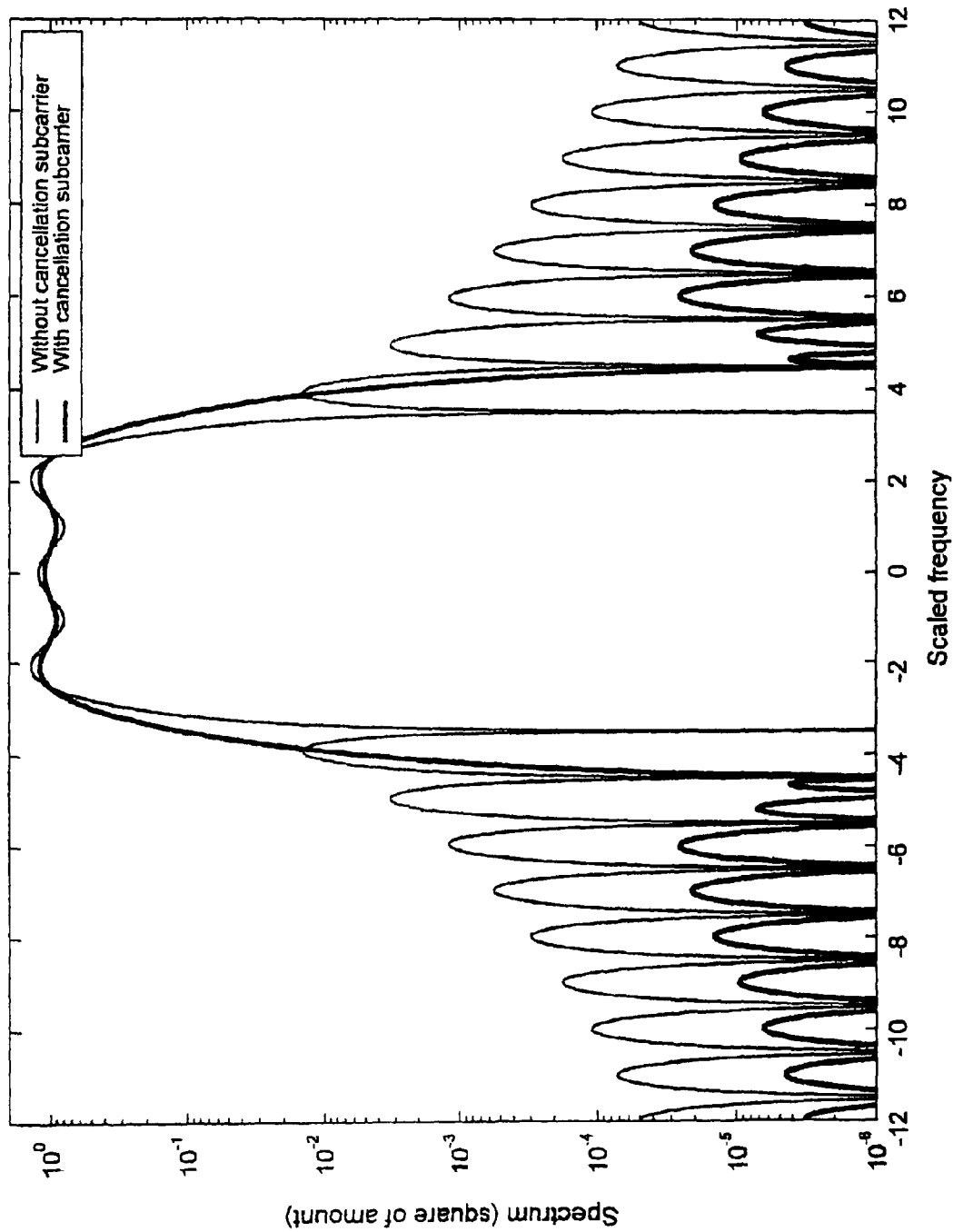
FIG. 3 is a comparison graph plotting the OFDM transmission signal spectrum with/without cancellation subcarriers, showing the power density spectra of OFDM transmission signal without cancellation subcarriers and of OFDM transmission signal with cancellation subcarriers on a logarithmic scale.

Referring now to FIG. 3 there is illustrated the power density spectra of the OFDM transmission signal without cancellation subcarriers (thin grey line) and of the OFDM transmission signal with cancellation subcarriers (bold line) in comparison on a logarithmic scale for a better appreciation of side lobe suppression as achieved by the method in accordance with the present invention. In the example under consideration a side lobe suppression of better than 20 dB is achieved.

After having demonstrated that introducing cancellation subcarriers can result in substantial side lobe suppression it will now be explained how the cancellation subcarriers can be suitably determined to achieve optimum spectral side lobe suppression.

Since the subcarriers 1 and 8 are omitted in forming the summation signal s(x), to make room for the cancellation subcarriers at the center frequencies $f_1$ and $f_8$, the OFDM transmission signal s(x) without cancellation subcarriers in the example under consideration equates to be $$s(x) = \sum_{n=2}^{7} s_n(x) = \sum_{n=2}^{7} d_n \cdot \frac{\sin(x - x_n)}{x - x_n} \quad (2)$$

The left-hand cancellation subcarrier at the center frequency $f_1$ is $c_L(x)$ and the right-hand cancellation subcarrier with the center frequency $f_N$ is $c_R(x)$. For optimum side lobe suppression by the cancellation subcarriers $c_L(x)$ and $c_R(x)$, these are scaled with a weighting factor $g_L$ and $g_R$ respectively. In the present example the weighting factors are purely real since they are based on a BPSK modulation. Determining the weighting factors is performed in accordance with an optimization criterion. In the present example use is made for this of the squared error between the OFDM transmission signal s(x) and the weighted cancellation subcarriers $g_L \cdot c_L(x)$ and $g_R \cdot c_R(x)$ in each case in the domain of the first side lobe outside of the communication bandwidth $$\int_{-5,5}^{-4,5} |s(x) - g_L \cdot c_L(x)|^2 dx \to \min \quad (3)$$

$$\int_{4,5}^{5,5} |s(x) - g_R \cdot c_R(x)|^2 dx \to \min \quad (4)$$

Determining the weighting factors $g_L$ and $g_R$ in accordance with equations (3) and (4) can be performed with or without taking into account constraints. For instance, as a constraint the requirement could be made that the power $P_c$ of the weighted cancellation subcarriers $g_L \cdot c_L(x)$ and $g_R \cdot c_R(x)$ in accordance with $$P_c = |g_L|^2 + |g_R|^2 \quad (5)$$

must not exceed a determined proportion $\epsilon$, $0 \leq \epsilon \leq 1$ of the total transmission power $P_{OFDM}$ where $$P_{OFDM} = \sum_{n=2}^{7} |d_n|^2 + |g_L|^2 + |g_R|^2 \quad (6)$$

$$P_c \leq \varepsilon \cdot P_{OFDM} \quad (7)$$

Optimizing the weighting factors $g_L$ and $g_R$ as formulated in equations (3) and (4) with or without taking into account the constraint of equation (7) is a known mathematical problem, the solution of which reads from pertinent literature, for example, Courant, R.; Hilbert D.: "Methods of Mathematical Physics", New York: John-Wiley & Sons, 1989 and Golub, G. H.; van Loan, C. F.: "Matrix. Computations", Third Edition, The John Hopkins University Press 1996.

The method in accordance with the present invention is not restricted to the example embodiment as described above, but can be generalized for the following applications:

The method in accordance with the present invention is not only applicable to OFDM communication systems but to all communication methods based on OFDM such as, for example, orthogonal frequency division multiple access (OFDMA) and multi-carrier code division multiple access (MC-CDMA).

The method in accordance with the present invention is applicable to OFDM systems or OFDM-based multi-carrier communication systems with any number N of subcarriers.

The method in accordance with the present invention is not restricted to BPSK, but can be extended to all methods of modulation, such as for example QPSK or QAM, used in OFDM communication systems or OFDM-based multi-carrier communication systems.

The method in accordance with the present invention is not restricted to use of real weighting factors for the cancellation subcarriers. Instead, the weighting factors may also be generally complex especially when methods of modulation other than BPSK are used in the OFDM communication systems or OFDM based multi-carrier communication systems concerned.

The method in accordance with the present invention is not restricted to a number M=2 cancellation subcarriers. Instead, any number M<N cancellation subcarriers can be used.

The method in accordance with the present invention is not restricted to cancellation subcarriers at both edges of the transmission signal spectrum. Instead, the M<N cancellation subcarriers can be any subcarriers of the OFDM communication system or of the OFDM based multi-carrier communication system.

The method in accordance with the present invention is not restricted to use of the optimization criterion "minimum squared error" between OFDM transmission signal s(x) and the weighted cancellation subcarriers $g_L \cdot c_L(x)$ and $g_R \cdot c_R(x)$ in each case in the domain of the first side lobe outside of the communication bandwidth. Both other optimization criteria than the criterion "minimum square error" as well as other domains than that of the first side lobe can be employed in which the optimization criterion is applied. Furthermore, in addition to the complex weighting factors of the cancellation subcarriers also their subcarrier positions (center frequencies) in the OFDM communication system or OFDM based multi-carrier communication system can be considered as optimization parameters, in thus enhancing the degree of freedom for the optimizing task and thus achieving a potential improvement in the result of optimization.

Optimizing the weighting factors can be performed both with and without constraints. When optimizing the weighting factors with constraints, the method in accordance with the present invention is not restricted to the constraint which limits the transmission power of the cancellation subcarriers. Instead, any other constraints can be taken into account in optimizing the weighting factors.

The method in accordance with the present invention is not restricted to determining the cancellation subcarriers and their weighting factors in the frequency domain. Instead, the cancellation subcarriers can be inserted in the time domain.

The method in accordance with the present invention is applicable to OFDM systems or OFDM based multi-carrier communication systems in which a defined part of the subcarriers is left free such as, for example, in an OFDMA reverse link.

The method in accordance with the present invention can be combined simply with other methods for side lobe suppression, for example with the three prior art methods as discussed in the background description. This is possible since the method in accordance with the present invention requires no basic changes to the OFDM communication system or OFDM-based multi-carrier communication system. The resulting communication system with cancellation subcarriers remains an OFDM communication system or OFDM-based multi-carrier communication system.

The method in accordance with the present invention can be put to use in all OFDM-based wired multi-carrier communication systems to achieve therein spectral side lobe suppression. In conjunction with wired communication, OFDM is often also termed discrete multi-tone (DMT) modulation. OFDM or DMT is often used as the digital link in last mile wired communication. The various communication techniques existing for this purpose come under the heading digital subscriber line (DSL). DSL communication techniques are, for example, high-speed HDSL, asymmetric (ADSL) and symmetric (SDSL) all of which are examples for application of the gist of the present invention in the scope of wired communication. Furthermore, the method in accordance with the present invention can be put to use for OFDM systems in the scope of power line communication.

The method in accordance with the present invention can be put to use in all OFDM-based wireless communication systems to achieve therein spectral side lobe suppression. Application in this case covers both already standardized OFDM-based systems such as for example DAB, DVB-T, WLAN in accordance with HIPERLAN/2 or IEEE 802.11a/b/g or metropolitan area network (MAN) in accordance with IEEE 802.16/802.16a standards as well as new systems such as for example OFDM-based MC-CDMA developments in the scope of fourth generation (4G) mobile radio.

The method in accordance with the present invention also finds highly interesting application in conjunction with so-called OFDM-based overlay systems. An overlay system is a communication system (filler system) which works in the frequency band of another communication system (main system) where it uses the idle frequency gaps. Systems particularly suitable for overlay applications are OFDM-based systems since these by deactivating individual subcarrier groups can leave free domains in the spectrum in which the main system is communicating at the time. However, the strong side lobes of a standard OFDM method would either interfere with the main system or make it necessary to use large guard bands or steep transmission filters. Thus, it is side lobe suppression in accordance with the present invention that now makes an efficient achievement of overlay systems possible for the first time.

The method in accordance with the present invention thus makes it possible to eliminate additional filtering or pulse shaping of the transmission signal whilst permitting the use of smaller guard bands, without negatively influencing the properties of the OFDM transmission signal. The sole, but not particularly relevant drawback is a slightly smaller communication capacity since the cancellation subcarriers, cannot be used for data communication.

Furthermore, the method in accordance with the present invention permits achievement of efficient OFDM-based overlay systems as more recent R&D products for better utilization of the valuable resource spectrum. The potential range of application for overlay systems extends from terrestrial to aerospace and satellite communication. At this time e.g. work is going on in an EU project in the 6$^{th}$ Framework Program in developing an overlay system for future air traffic control (ATC) communication in the VHF band.

The invention claimed is:

1. A method for spectral side lobe suppression of a transmission signal comprising the steps of:
   (a) providing a communication system selected from a group of systems, the group consisting of a wireless or wired orthogonal frequency-division multiplexing (OFDM) communication system, an OFDM multicarrier communication system, and an OFDM-based multicarrier communication system; and
   (b) inserting certain subcarriers as cancellation subcarriers in a frequency range of the communication system, the cancellation subcarriers containing, instead of complex data symbols, complex weighting factors;
   wherein the complex weighting factors are determined for each OFDM symbol sequence separately so that in accordance with an optimization criterion spectral side lobes of the each OFDM symbol sequence of an OFDM transmission of the communication system are minimized; and
   wherein as the optimization criterion for determining the complex weighting factors, use is made of minimizing a squared error between the transmission signal and scaled weighted cancellation subcarriers in each domain of a first spectral side lobe outside of the communication bandwidth or in another side lobe domain.

2. The method as set forth in claim 1, wherein the cancellation subcarriers are usual or any selectable OFDM subcarriers which are thus orthogonal to all other subcarriers.

3. The method as set forth in claim 1, wherein a defined part of the subcarriers is left in OFDMA reverse link.

4. The method as set forth in claim 1, wherein any number M of cancellation subcarriers selectable from the N OFDM subcarriers, where M<N, are inserted in the frequency range of the communication system.

5. The method as set forth in claim 1, wherein subcarriers at both edges of the OFDM signal spectrum are selected as cancellation subcarriers.

6. The method as set forth in claim 1, comprising use of a modulation method comprising BPSK, QPSK or QAM compatible with OFDM communication systems or OFDM/OFDM-based multi-carrier communication systems.

7. The method as set forth in claim 6, wherein binary phase shift keying (BPSK) is used as the modulation method.

8. The method as set forth in claim 7, wherein the weighting factors are selected so as to be real.

9. The method as set forth in claim 1, wherein in optimizing side lobe suppression in addition to the complex weighting factors of the cancellation subcarriers also their subcarrier positions (center frequencies) in the OFDM communication system or in the OFDM or OFDM based multi-carrier communication system are taking into account as optimization parameters.

10. The method as set forth in claim 1, wherein optimizing the weighting factors of the cancellation subcarriers is performed without constraints.

11. The method as set forth in claim 1, wherein optimizing the weighting factors of the cancellation subcarriers is performed with constraints and wherein the optimization criterion in each case is not restricted to the constraint which limits the transmission power of the cancellation subcarriers, but wherein any other constraints are taken into account.

12. The method as set forth in claim 1, wherein the cancellation subcarriers are inserted in the time domain.

13. The method as set forth in claim 1, comprising a combination of one or more other methods for spectral side lobe suppression in the corresponding OFDM communication system or OFDM or OFDM-based multi-carrier communication system.

14. The method as set forth in claim 1, wherein the communication system is an OFDM-based wired communication system.

15. The method as set forth in claim 14, wherein a digital subscriber line (DSL) communication technique is used to suppress spectral side lobes in a last mile digital link.

16. The method as set forth in claim 14, wherein the communication system is an OFDM power line communication system.

17. The method as set forth in claim 1, wherein the communication system is an OFDM-based wireless communication system.

18. The method as set forth in claim 17, wherein the communication system is an already standardized OFDM-based system comprising DAB, DVB-T, WLAN in accordance with HIPERLAN/2 or IEEE 802.11a/b/g or metropolitan area network (MAN) in accordance with IEEE 802.16/802.16a standards.

19. The method as set forth in claim 17, wherein the communication system is an OFDM-based MC-CDMA communication system of a fourth generation (4G) mobile radio.

20. The method as set forth in claim 1 in conjunction with an OFDM-based overlay communication system, i.e. a communication system working as a filler system in the frequency band of another communication system operated as the main system where it uses the existing idle frequency gaps.

21. The method as set forth in claim 20, wherein the OFDM-based overlay communication system is a terrestial radio communication system.

22. The method as set forth in claim 20, wherein the OFDM-based overlay communication system is an aerospace communication system.

23. The method as set forth in claim 20, wherein the OFDM-based overlay communication system is a satellite communication system.

* * * * *